United States Patent [19]

Kirsgalvis

[11] Patent Number: 5,441,650
[45] Date of Patent: Aug. 15, 1995

[54] METHOD AND APPARATUS FOR A NON-SEALING FILTER ELEMENT

[75] Inventor: Richard D. Kirsgalvis, Michigan City, Ind.

[73] Assignee: Le Sac Corporation, Michigan City, Ind.

[21] Appl. No.: 137,298

[22] Filed: Oct. 15, 1993

[51] Int. Cl.⁶ .................................... B01D 29/27
[52] U.S. Cl. ................................ 210/767; 210/452; 210/455
[58] Field of Search .............. 210/232, 238, 248, 448, 210/451, 452, 453, 454, 455, 461, 463, 767; 55/361, 373, 378, 381

[56] References Cited

U.S. PATENT DOCUMENTS

| | | |
|---|---|---|
| 54,894 | 5/1866 | Griffitts . |
| 152,981 | 7/1874 | Donkin . |
| 220,691 | 10/1879 | Adney . |
| 515,833 | 3/1894 | Kuersten . |
| 607,570 | 7/1898 | McLean . |
| 732,659 | 6/1903 | Scott . |
| 979,481 | 12/1910 | Hannold . |
| 1,331,732 | 2/1920 | Walt . |
| 1,458,464 | 10/1921 | Byers . |
| 1,604,048 | 10/1926 | Hobbs . |
| 1,786,500 | 12/1930 | McGonigal . |
| 2,048,350 | 7/1936 | McLean . |
| 2,186,987 | 1/1940 | Nesset . |
| 2,191,395 | 2/1940 | Moser . |
| 2,242,807 | 5/1941 | Austin . |
| 2,331,332 | 10/1943 | Latta . |
| 2,346,018 | 4/1944 | Fulton . |
| 2,352,300 | 6/1944 | Walker et al. . |
| 2,559,983 | 7/1951 | Miller . |
| 2,658,625 | 11/1953 | Rafferty . |
| 2,963,282 | 12/1960 | Jacobitz et al. . |
| 3,037,634 | 6/1962 | Mills . |
| 3,170,873 | 2/1965 | May . |
| 3,230,560 | 1/1966 | Nielsen . |
| 3,335,917 | 8/1967 | Knight . |
| 3,387,712 | 6/1968 | Schrink . |
| 3,503,516 | 3/1970 | Harms et al. . |
| 3,513,500 | 5/1970 | Hori . |
| 3,524,548 | 8/1970 | McDonald et al. |
| 3,592,768 | 7/1971 | Parker . |
| 3,640,392 | 2/1972 | Smith et al. . |
| 3,651,947 | 3/1972 | Schollhamer . |
| 3,770,110 | 10/1972 | Engelitcheff, Jr. . |
| 3,771,664 | 11/1973 | Schrink et al. . |
| 3,774,769 | 11/1973 | Smith . |
| 3,794,180 | 2/1974 | Blocker . |
| 3,814,261 | 6/1974 | Morgan, Jr. . |
| 3,822,018 | 7/1974 | Krongos . |

(List continued on next page.)

FOREIGN PATENT DOCUMENTS

| | | |
|---|---|---|
| 242082 | 11/1925 | United Kingdom . |
| 2042359 | 5/1983 | United Kingdom . |
| 2113110 | 12/1983 | United Kingdom . |

Primary Examiner—Robert A. Dawson
Assistant Examiner—W. L. Walker
Attorney, Agent, or Firm—Dvorak and Traub

[57] ABSTRACT

A method and apparatus for filtering a material that flows through a filter housing having a housing chamber, a material inlet port, a material outlet port, and an annular shoulder disposed in the housing chamber. A non-sealing filter element having a fluid pervious filter bag fixed to a non-sealing shape retaining filter collar assembly including an annular sleeve, an outturned annular flange, and a fluid pervious annular filter element disposed on the annular shoulder of the housing chamber. The fluid pervious annular filter element may be a separate element interposing the outturned annular flange of the non-sealing shape retaining filter collar assembly and the annular shoulder of the filter housing to filter material not filtered by the fluid pervious filter bag. Alternatively, the outturned annular flange and the annular sleeve of the non-sealing shape retaining filter collar assembly may be comprised of a fluid pervious material to filter material not filtered by the fluid pervious filter bag.

8 Claims, 4 Drawing Sheets

U.S. PATENT DOCUMENTS

| | | |
|---|---|---|
| 3,847,817 | 11/1974 | Jarman . |
| 3,883,331 | 5/1975 | Bernard et al. . |
| 3,931,015 | 1/1976 | Jenkins . |
| 3,935,112 | 1/1976 | Greutert . |
| 3,959,137 | 5/1976 | Kirsgalvis . |
| 4,022,693 | 5/1977 | Morgan, Jr. . |
| 4,024,065 | 5/1977 | Morgan, Jr. . |
| 4,053,393 | 10/1977 | Day et al. . |
| 4,059,518 | 11/1977 | Rishel . |
| 4,073,632 | 2/1978 | Reinauer et al. . |
| 4,081,379 | 3/1978 | Smith . |
| 4,089,664 | 5/1978 | Noland . |
| 4,133,769 | 1/1979 | Morgan, Jr. . |
| 4,157,964 | 6/1979 | Rischel . |
| 4,204,966 | 5/1980 | Morgan, Jr. . |
| 4,209,875 | 7/1980 | Pugh et al. . |
| 4,220,542 | 9/1980 | Morgan, Jr. . |
| 4,259,188 | 3/1981 | Morgan . |
| 4,281,098 | 8/1981 | Morgan, Jr. . |
| 4,285,814 | 8/1981 | Morgan, Jr. . |
| 4,297,209 | 10/1981 | DeVisser et al. . |
| 4,322,293 | 3/1982 | Morgan, Jr. . |
| 4,460,468 | 7/1984 | Morgan . |
| 4,539,116 | 9/1985 | Morin . |
| 4,552,661 | 11/1985 | Morgan . |
| 4,610,787 | 9/1986 | Morgan et al. . |
| 4,642,188 | 2/1987 | DeVisser et al. . |
| 4,664,798 | 5/1987 | Bergh . |
| 4,669,167 | 6/1987 | Asterlin . |
| 4,701,259 | 10/1987 | Rossen . |
| 4,836,922 | 6/1989 | Rishel et al. . |
| 4,948,504 | 8/1990 | Kierdorf et al. . |
| 4,966,697 | 10/1990 | Rossen . |
| 4,986,912 | 1/1991 | Fisch . |
| 5,075,004 | 12/1991 | Gershenson et al. . |
| 5,137,632 | 8/1992 | Morgan, Jr. . |
| 5,139,672 | 8/1992 | Ohbayashi . |
| 5,188,731 | 2/9193 | Lapoint, Jr. . |
| 5,192,424 | 3/1993 | Beyne et al. . |
| 5,290,441 | 3/1994 | Griffin et al. ............... 210/497.01 |

METHOD AND APPARATUS FOR A NON-SEALING FILTER ELEMENT

FIELD OF THE INVENTION

The present invention relates to a novel method and apparatus for filtering a material that flows through a filter housing. Specifically, the invention relates to a non-sealing filter element having a fluid pervious filter bag fixed to a non-sealing shape retaining filter collar assembly disposed in the filter housing. The non-sealing shape retaining filter collar assembly ensures filtration of the material not filtered by the filter bag.

BACKGROUND OF THE INVENTION

Bag type fluid filters are generally comprised of a fluid pervious filter bag fixed to a rigid filter collar that is disposed on an annular shoulder in a filter housing. In principle, material, such as a fluid or a fluid-solid mixture, that flows through the housing is filtered through the filter bag to remove particulate matter suspended in the fluid. Invariably, some of the fluid that flows through the filter housing is not filtered by the filter bag because the fluid flows between the filter collar and the annular shoulder thereby circumventing the filter bag. To address this problem, it has in the past been suggested to form a fluid impervious seal between the filter collar and the shoulder of the housing to prevent the flow of fluid therebetween. For example, it is known to dispose a seal or gasket between the filter collar and the annular shoulder, or to fabricate the filter collar from a material that forms a fluid impervious seal between the filter collar and the annular shoulder. These proposed methods of forming a fluid impervious seal between the filter collar and the annular shoulder generally require that an external force be applied to the rigid filter collar to form and maintain the seal. For example, the filter collar may be fastened to the annular shoulder by one or more fasteners, or the filter collar may be clamped between the annular shoulder and a housing cap. Other proposed methods of forming a seal between the filter collar and the annular shoulder include fabricating fluid impervious filter collars having a lip or flange that snap fits into an annular receiving groove proximate the annular shoulder. All of the proposed methods and apparatuses for preventing the flow of fluid between the filter collar and the shoulder of the housing have the disadvantage that they require additional structure, precise dimensions or skilled installation to ensure the formation of a seal. Furthermore, the proposed solutions are expensive and, from a practical standpoint, often do not form a satisfactory seal resulting in the passage of unfiltered material through the filter housing. There is therefore a demonstrated need for an advancement in the art of filtering a material that flows through a filter housing.

It is an object of the present invention to provide a novel method and apparatus for filtering material that flows through a filter housing.

It is a another object of the present invention to provide a novel non-sealing filter element.

It is a another object of the present invention to provide a novel non-sealing filter element that is economical to manufacture.

It is a further object of the present invention to provide a novel non-sealing filter element having a fluid pervious filter bag fixedly disposed on a non-sealing shape retaining filter collar assembly.

It is a further object of the present invention to provide a novel non-sealing filter element having a fluid pervious filter bag disposed on a non-sealing shape retaining filter collar assembly wherein the non-sealing shape retaining filter collar includes a fluid pervious annular filter element.

It is a further object of the present invention to provide a novel non-sealing filter element having a fluid pervious filter bag disposed on a non-sealing shape retaining filter collar assembly wherein the non-sealing shape retaining filter collar assembly includes a fluid pervious or impervious outturned annular flange and a fluid pervious annular filter element.

Accordingly, the present invention is directed toward a method and apparatus for filtering material that flows through a filter housing having a housing chamber, a material inlet port, a material outlet port, and an annular shoulder disposed in the housing chamber. A non-sealing filter element having a fluid pervious filter bag fixed to a shape retaining filter collar assembly including an annular sleeve, an outturned annular flange and a fluid pervious annular filter element is disposed on the annular shoulder of the housing chamber. The fluid pervious annular filter element may be a separate element interposing the outturned annular flange of the shape retaining filter collar assembly and the annular shoulder of the filter housing to filter material not filtered by the fluid pervious filter bag. Alternatively, the outturned annular flange or the annular sleeve of the non-sealing shape retaining filter collar may be comprised of a fluid pervious material to filter material not filtered by the fluid pervious filter bag.

These and other objects, features and advantages of the present invention will become apparent upon consideration of the following Detailed Description of the Invention with the accompanying drawings.

DETAILED DESCRIPTION OF THE INVENTION

Figure 1:
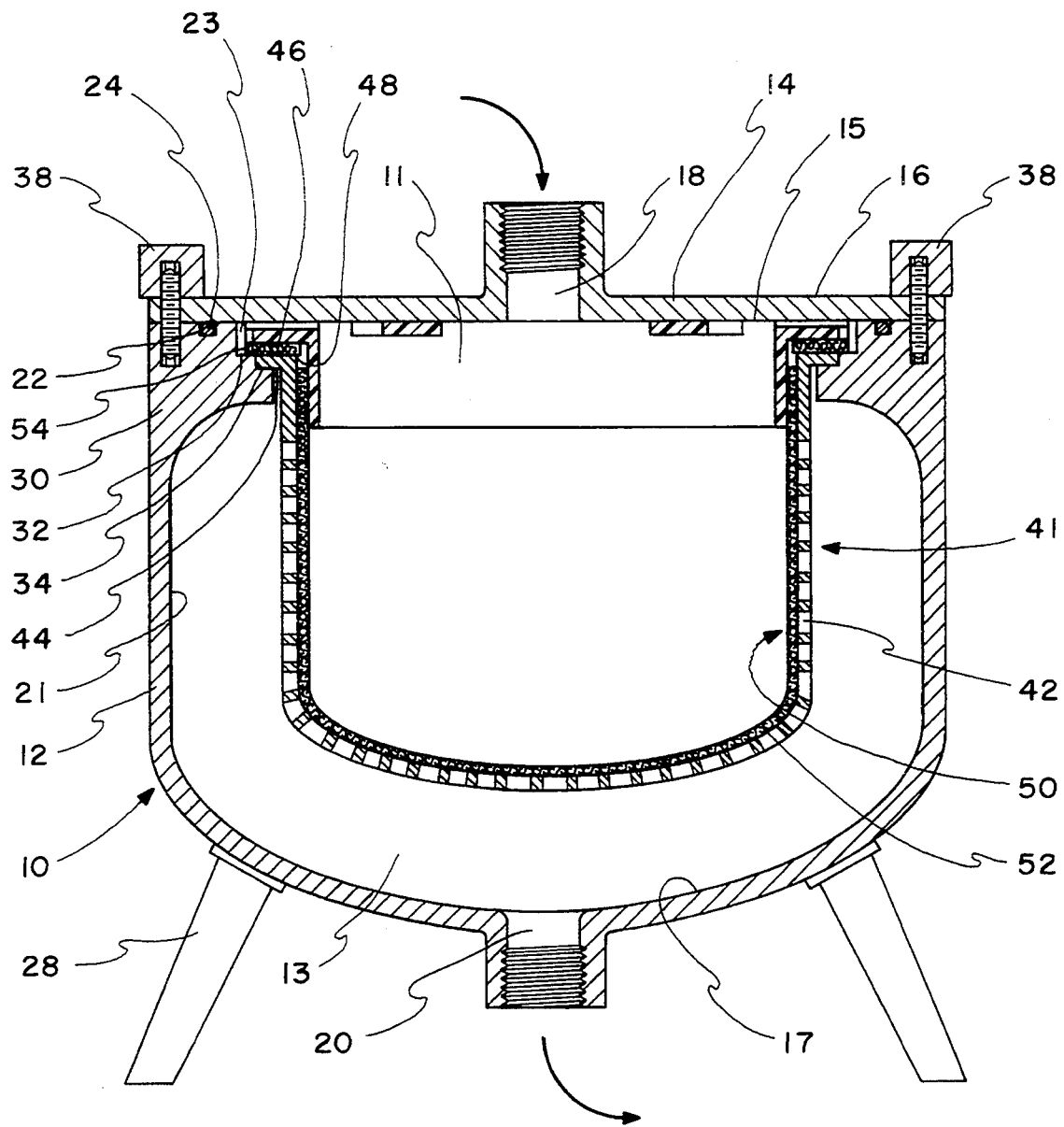
FIG. 1 is a sectional view of a filter housing and a non-sealing filter element of the present invention.

FIG. 1 is a sectional view of a filter housing 10 and a non-sealing filter element 50 disposed in the filter housing 10 for filtering a material that flows through the filter housing as discussed below. The filter housing 10 generally comprises a housing body 12 having an open end 11 covered by a removable filter housing cap 14 to form a housing chamber 13 for receiving the non-sealing filter element 50 of the present invention. The housing body 12 comprises an inner wall 21 and the open end 11 comprises an inner perimeter wall 23 and an open end surface 19 with a seal or gasket groove 22 for receiving a seal or gasket 24, preferably an 0-ring type seal. The housing body 12 may also include a support structure in the form of one or more support legs 28.

Figure 2:
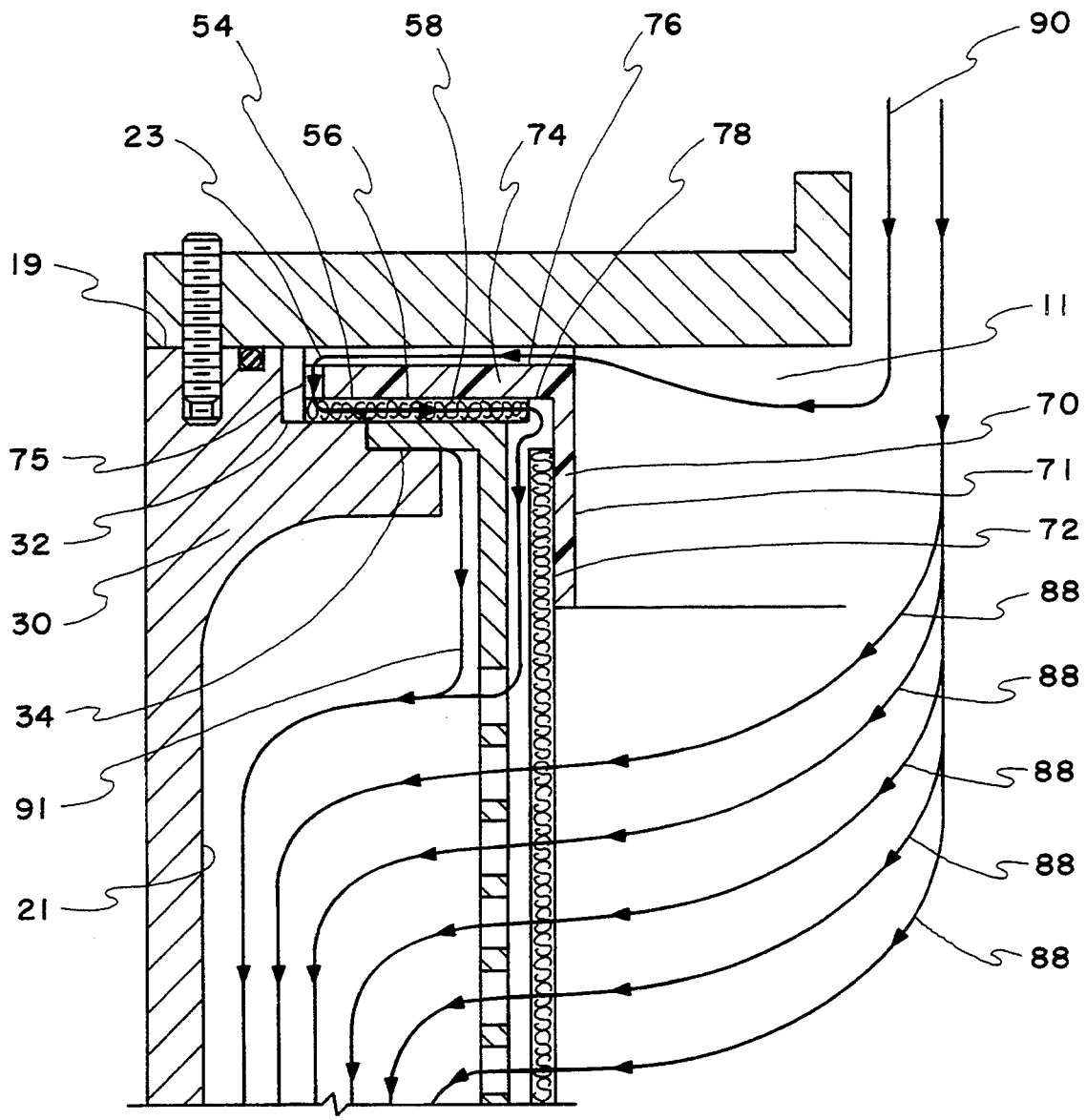
FIG. 2 is a partial sectional view of the embodiment of FIG. 1.
Figure 3:
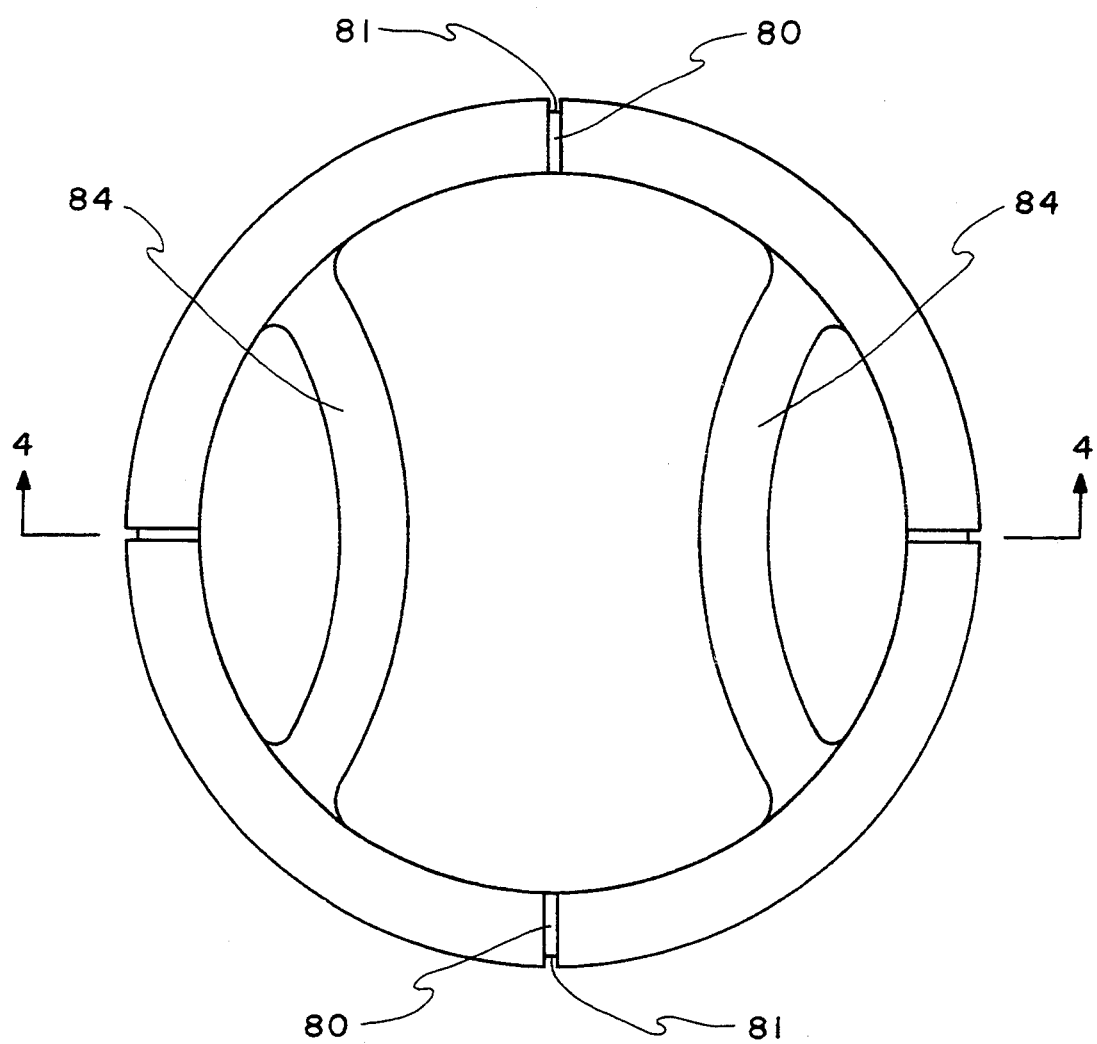
FIG. 3 is a top view of the non-sealing filter element of FIG. 1.

The filter housing cap 14 comprises an inner surface 15, an outer surface 16 and an inlet port 18 through which the fluid may pass into the housing chamber 13. The cap 14 may be removably secured to the open end 11 of the housing body 12 by fastening the cap 14 to the open end surface 19 with removable threaded members 38 or other means known in the art so that a fluid impervious seal is formed by the gasket 24 interposing the open end surface 19 of the filter housing wall 12 and the inner surface 15 of the cap 14. The housing body 12 also comprises a housing bottom wall 17 having an outlet port 20 through which the fluid may pass out of the housing chamber 13. FIG. 2 is a partial sectional view of the embodiment of FIG. 1 and shows an annular shoulder 30 disposed on the inner wall 21 near the open end 11 of the housing body 12. The annular shoulder 30 comprises an annular non-sealing filter element seating 32 and, optionally, an annular filter basket seating 34. The housing chamber 13 of the filter housing 10 may optionally receive a rigid filter basket 41 to support the non-sealing filter element 50. The rigid filter basket 41 comprises a reticulated filter basket wall 42 connected to an outturned annular filter basket flange 44 having a flange upper surface 46 and a flange lower surface 48 for engaging and seating on the annular filter basket seating 34 of the annular shoulder 30.

Figure 4:
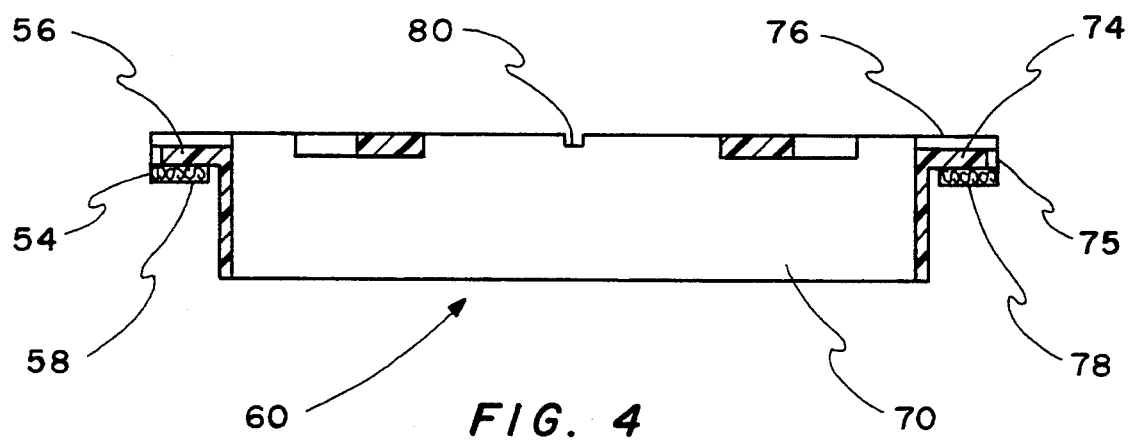
FIG. 4 is a sectional side view of the non-sealing filter element shown in FIG. 3.

The non-sealing filter element 50 of the present invention generally comprises a fluid pervious filter bag 52 and a non-sealing shape retaining filter collar assembly 60 having an annular sleeve 70, an outturned annular flange 74 and a fluid pervious filter element shown in FIGS. 1 and 4. The filter bag 52 has an open end and a closed end, and is formed, for example, of a non-woven filter material. The open end of the filter bag 52 is fixedly attached to the annular sleeve 70 of the non-sealing shape retaining filter collar assembly 60 by stitches, heat sealing or other means known in the art. In the embodiment of FIG. 2, the fluid pervious filter element is a separate fluid pervious annular filter element 54 having an upper surface 56 and a lower surface 58 and is preferably formed of a fluid pervious material, for example of a non-woven filter material such as polyester, polypropylene, nylon, cellulose or an equivalent. The annular sleeve 70 and outturned annular flange 74 may be formed of a fluid impervious material, for example a plastic. Alternatively, in the embodiment of FIG. 5, the annular sleeve 70 and the outturned annular flange 74 of the non-sealing shape retaining filter collar assembly 60 are comprised of a fluid pervious material thereby eliminating the requirement of the annular filter element 54 in the embodiment of FIG. 2. In a third embodiment, the fluid pervious annular filter element 54 may be used in combination with a fluid pervious annular sleeve 70 and outturned annular flange 74. In all embodiments, the annular sleeve 70 and the outturned annular flange 74 may form a unitary member wherein the annular sleeve 70 has an inner surface 71 and an outer surface 72 and the outturned annular flange 74 has an outer edge 75, an upper surface 76 and a lower surface 78. FIG. 2 and FIG. 4 show the outturned annular flange 74 having, as an option, one or more material passage grooves 80 radially disposed on the upper surface 76 and corresponding material passage grooves 81 disposed along the outer edge 75 thereof. Also, one or more handles 84 may be disposed across the non-sealing shape retaining filter collar assembly 60 to facilitate removal of the non-sealing filter element 50 from the filter housing 10.

Figure 5:
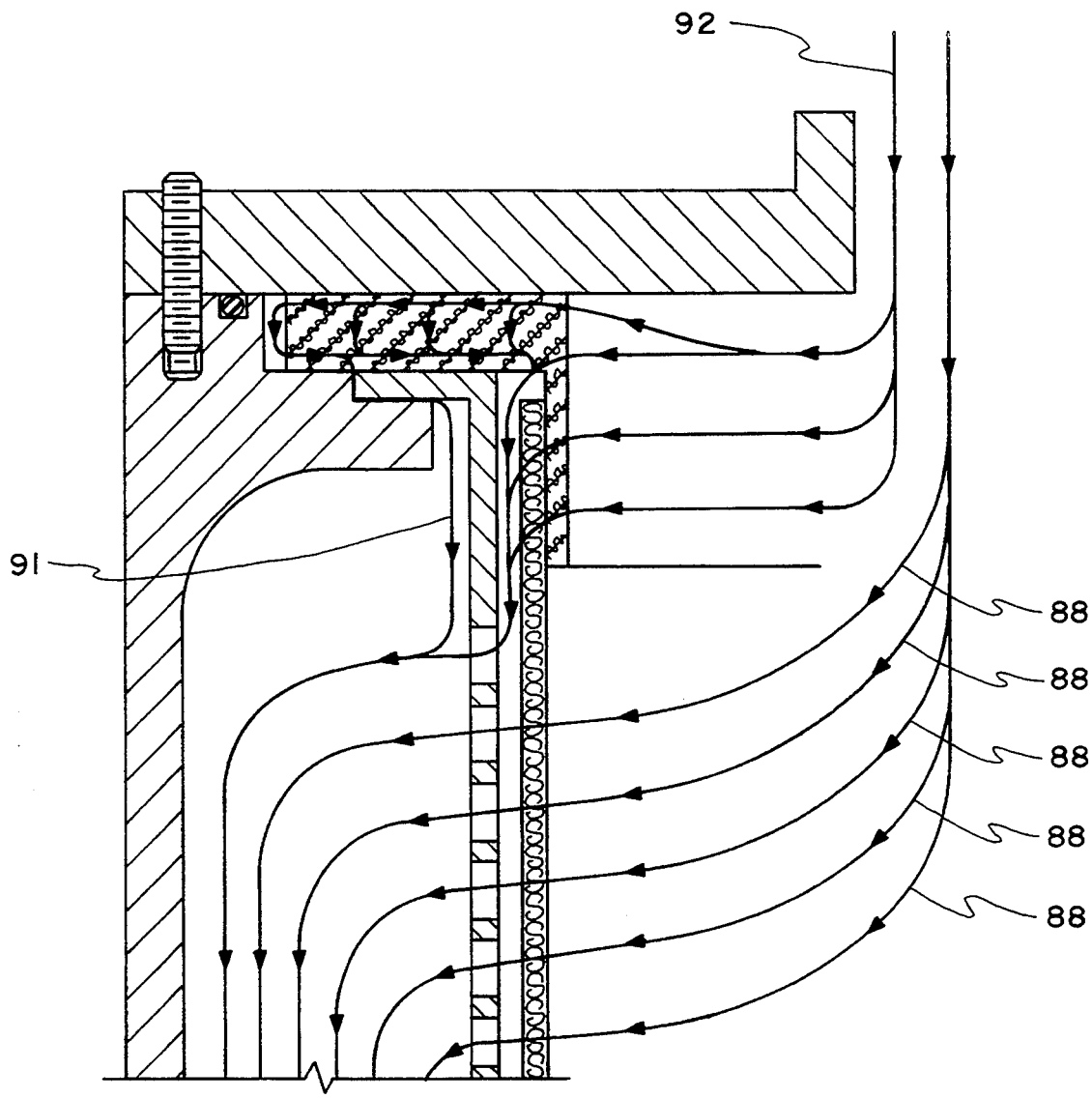
FIG. 5 is a partial sectional view of a second embodiment of the non-sealing filter element of the present invention.

The non-sealing filter element 50 is disposed in the filter housing 10 and the non-sealing shape retaining filter collar assembly 60 is seated on the annular non-sealing filter element seating 32. In the embodiment of FIG. 2, the lower surface 58 of the fluid pervious filter element 54 is seated on and is in contact with the annular non-sealing filter element seating 32. The lower surface 78 of the outturned annular flange 74 is seated on and is in contact with the upper surface 56 of the annular filter element 54 so that the closed end of the filter bag 52 is extended into the housing chamber 13. The outer edge 75 of the outturned annular flange 74 may or may not contact the inner perimeter wall 23 of the housing body 12. In an embodiment which includes a rigid filter basket 41 disposed on an annular filter basket seating 34, the lower surface 58 of the fluid pervious filter element 54 may also be seated on and in contact with the flange upper surface 46 of the outturned annular filter basket flange 44 and the closed end of the filter bag 52 will extend into and may be supported by the reticulated filter basket wall 42. The cap 14 may be dimensioned or configured so that the inner surface 15 of the cap 14 applies a force to the upper surface 76 of the outturned annular flange 74 to ensure that the lower surface 78 of the annular flange 74 is properly seated on and in contact with the upper surface 56 of the annular filter element 54 and to ensure that the lower surface 58 of the annular filter element 54 is properly seated on and in contact with the annular non-sealing filter element seating 32 of the filter housing 10. The fluid flow through the filter bag 52 will also ensure that the non-sealing shape retaining filter collar assembly 60 is properly seated on and in contact with the annular non-sealing filter element seating 32 as discussed above and therefore it is not necessary that the inner surface 15 of the cap 14 contact the upper surface 76 of the outturned annular flange 74. In the embodiment of FIG. 5, the lower surface 78 of the outturned annular flange 74 of the non-sealing shape retaining filter collar assembly 60 is seated on and in contact with the annular non-sealing filter element seating 32 so that the closed end of the filter bag 52 is extended into the housing chamber 13. In an embodiment which includes a rigid filter basket 41 disposed on an annular filter basket seating 34, the lower surface 78 of the outturned annular flange 74 may also be seated on and in contact with the flange upper surface 46 of the outturned annular filter basket flange 44 and the closed end of the filter bag 52 will extend into and may be supported by the reticulated filter basket wall 42. The cap 14 may be dimensioned or configured so that the inner surface 15 of the cap 14 applies a force to the upper surface 76 of the outturned annular flange 74 to ensure that the lower surface 78 of the outturned annular flange 74 is properly seated on and in contact with the annular non-sealing element seating 32 of the filter housing 10. The fluid flow through the filter bag 52 will also ensure that the non-sealing shape retaining filter collar assembly 60 is properly seated on and in contact with the annular non-sealing filter element seating 32 as discussed above and therefore it is not necessary that the inner surface 15 of the cap 14 contact the upper surface 76 of the outturned flange 74.

In operation, the non-sealing filter element 50 of the present invention filters all material that flows from the inlet port 18 and into the housing. Most of the material that flows into the filter housing 10 flows from the inlet port 18, into the chamber housing 13 where the material is filtered by the filter bag 52 as illustrated by flow lines 88 in FIG. 2 and FIG. 5. In the embodiment of FIG. 2, the non-sealing filter element allows the material that is not filtered by the filter bag 52 to flow over the upper surface 76 of the outturned annular flange 74 through the material flow grooves 80 or through a space between the upper surface 76 of the outturned annular flange 74 and the inner surface 15 of the cap 14, down along the inner perimeter 23 of the housing body 12 or through the material flow grooves 81, and then back toward the annular sleeve 70 where the material is filtered by the annular filter element 54 as illustrated by flow lines 90. The annular filter element 54 ensures the filtration of material that is not filtered by the filter bag 52. In the embodiment of FIG. 5, material that is not filtered by the filter bag 52 is filtered by the fluid pervious outturned annular flange 74 and the annular sleeve 70 of the non-sealing shape retaining filter collar assembly 60 as illustrated by flow lines 92. The fluid pervious outturned annular flange 74 and annular sleeve 70 ensure the filtration of fluid that is not filtered by the filter bag 52. In an embodiment which includes both a fluid pervious annular filter element 54 and a fluid pervious outturned annular flange 74 and fluid pervious annular sleeve 70, the flow is along both the flow lines 90 and 92 in FIG. 2 and FIG. 5 so that the fluid pervious annular filter element 54 and the fluid pervious outturned annular flange 74 and fluid pervious annular sleeve 70 filter the material. In an embodiment that includes a rigid filter basket 41, filtered fluid may flow between the lower surface 48 of the basket flange 44 and the annular filter basket seating 34 of the shoulder 30 as illustrated by flow lines 91 in FIG. 2 and FIG. 5. In all of the embodiments specifically disclosed herein and equivalent embodiments, material flowing into the filter housing 10 is either filtered by the filter bag 52 or by one or more elements of the non-sealing shape retaining filter collar assembly 60 of the non-sealing filter element 50.

The foregoing is a description enabling one of ordinary skill in the art to make and use the preferred embodiments of the present invention. It will be appreciated by those skilled in the art that there exists variations, modifications and equivalents to the embodiments disclosed herein. The present invention therefore is to be limited only by the scope of the appended claims.

What is claimed is:

1. A non-sealing filter element comprising:
   a filter housing having a housing chamber, a material inlet port, a material outlet port, and an annular shoulder;
   a non-sealing shape retaining filter collar assembly having an annular sleeve and an outturned annular flange, the annular sleeve having an outer surface, the outturned annular flange having an upper surface and a lower surface, a fluid pervious annular filter element having an upper surface and a lower surface, the lower surface of the fluid pervious annular filter element being disposed on the annular shoulder of the filter housing and the lower surface of the outturned annular flange being disposed on the upper surface of the fluid pervious annular filter element: and
   a fluid pervious filter bag having an open end and a closed end, the open end of the fluid pervious filter bag fixedly disposed on the annular sleeve of the shape retaining filter collar assembly and the closed end of the fluid pervious filter bag extended into the housing chamber wherein material flowing through the annular sleeve of the shape retaining filter collar assembly is filtered by the fluid pervious filter bag and material not filtered by the fluid pervious filter bag is filtered by the fluid pervious annular filter element.

2. A non-sealing filter element according to claim 1, wherein the outturned annular flange is a fluid impervious outturned annular flange, and the annular sleeve is a fluid impervious annular sleeve.

3. A non-sealing filter element according to claim 2, further comprising a radial material passage groove extending radially across the upper surface of the outturned annular flange, and a vertical material passage groove extending down a vertical side of the outturned annular flange, wherein material not filtered by the fluid pervious filter bag flows in part through the radial material passage groove and down the vertical material passage groove and is filtered by the fluid pervious annular filter element.

4. A non-sealing filter element according to claim 3, further comprising a filter removal handle.

5. A non-sealing filter element comprising:
   a filter housing having a housing chamber, a material inlet port, a material outlet port, and an annular shoulder, the non-sealing filter element;
   a non-sealing fluid pervious shape retaining filter collar assembly having an annular sleeve and an outturned annular flange, the annular sleeve having an outer surface and the outturned annular flange having an upper surface and a lower surface, the lower surface of the outturned annular flange being disposed on the annular shoulder of the filter housing; and
   a fluid pervious filter bag having an open end and a closed end, the open end of the fluid pervious filter bag fixedly disposed on the annular sleeve of the non-sealing fluid pervious shape retaining filter collar assembly and the closed end of the fluid pervious filter bag extended into the housing chamber wherein material flowing through the annular sleeve of the fluid pervious shape retaining filter collar assembly is filtered by the fluid pervious filter bag and material not filtered by the fluid pervious filter bag is filtered by the non-sealing fluid pervious shape retaining filter collar assembly.

6. A non-sealing filter element according to claim 5, wherein the outturned annular flange of the non-sealing fluids pervious filter collar comprises in part a fluid pervious annular filter element wherein the fluid not filtered by the fluid pervious filter bag may be filtered by the fluid pervious annular filter element.

7. A method for filtering a material flowing through a non-sealing filter element disposable in a filter housing, the non-sealing filter element having a fluid pervious annular filter element and a fluid pervious filter bag fixedly disposed on a shape retaining filter collar assembly having an outturned annular flange and an annular sleeve, the filter housing having a housing chamber, a material inlet port, a material outlet port, and an annular shoulder for supporting the outturned annular flange of the shape retaining filter collar assembly, the method comprising steps of:
   filtering a material flowing through the annular sleeve of the shape retaining filter collar assembly with the fluid pervious filter bag; and filtering material not filtered with the fluid pervious filter bag with the fluid pervious annular filter element.

8. A method for filtering a material flowing through a non-sealing filter element disposable in a filter housing, the non-sealing filter element having a fluid pervious filter bag disposed on a fluid pervious shape retaining filter collar assembly having an outturned annular flange and an annular sleeve, the filter housing having a housing chamber, a material inlet port, a material outlet port, and an annular shoulder for supporting the outturned annular flange of the fluid pervious shape retaining filter collar assembly, the method comprising steps of:

filtering a material flowing through the annular sleeve of the shape retaining filter collar assembly with the fluid pervious filter bag, and filtering material not filtered with the fluid pervious filter bag with the fluid pervious shape retaining filter collar assembly.

* * * * *